Sept. 2, 1969   C. R. RODRIGUEZ   3,464,608
BUMPER CARRIERS FOR BICYCLE
Filed Sept. 7, 1967
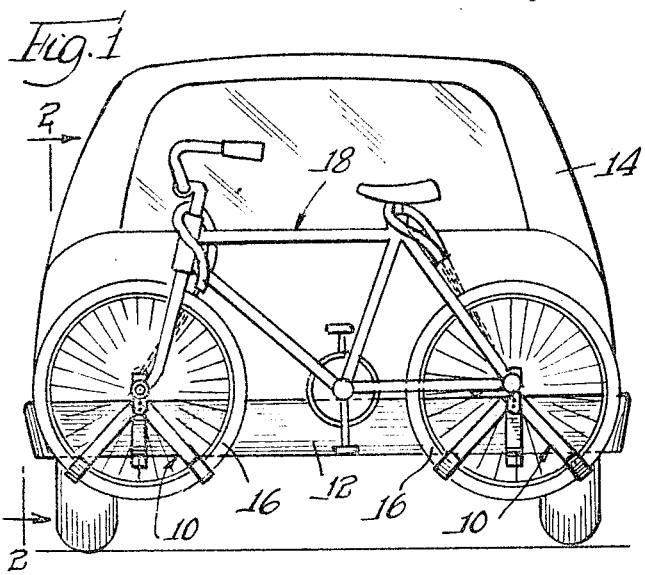
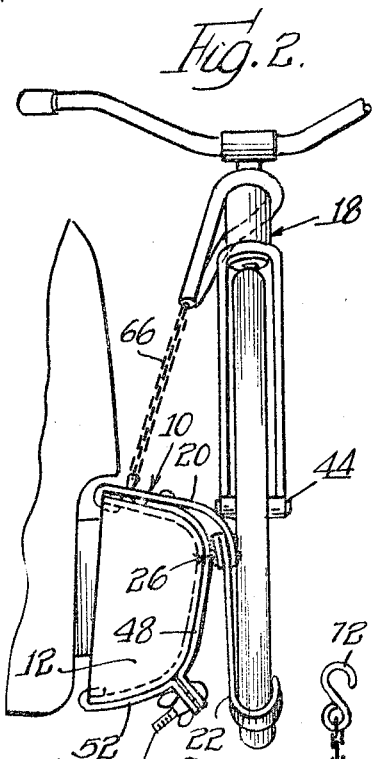
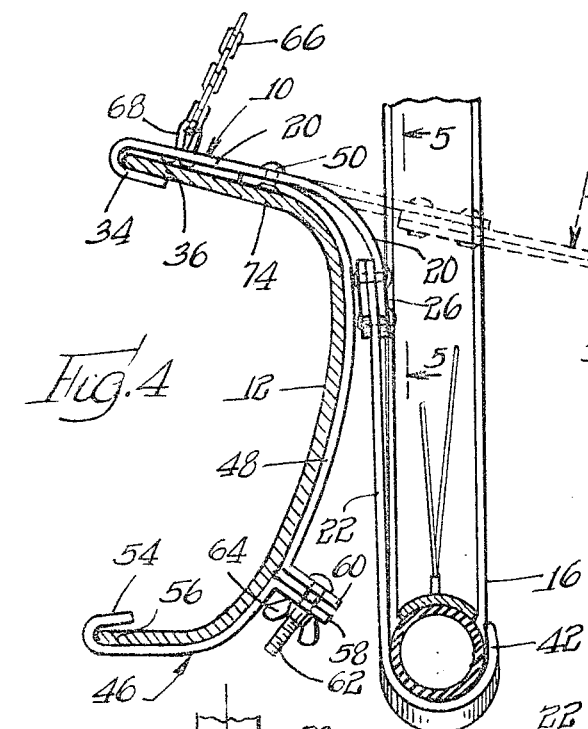
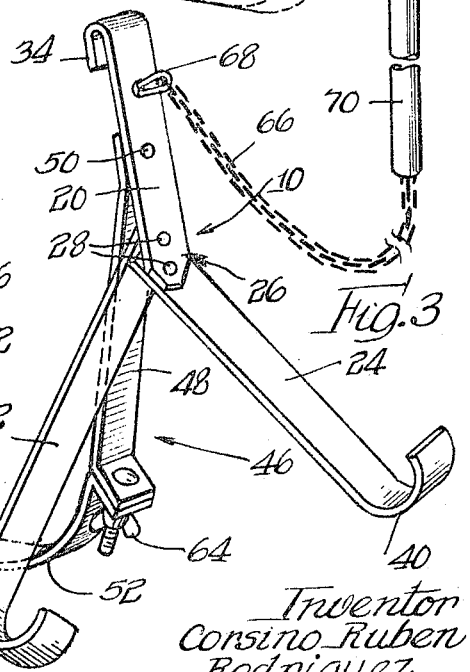
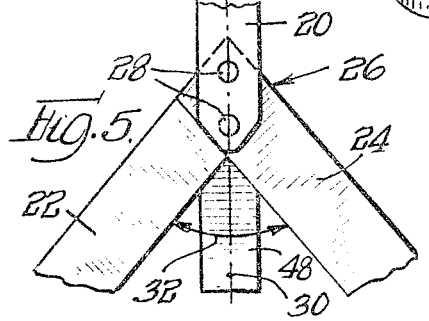
Inventor
Consino Ruben Rodriguez
By: Olson, Trexler, Wolters & Bushnell attys

United States Patent Office 3,464,608
Patented Sept. 2, 1969

3,464,608
BUMPER CARRIERS FOR BICYCLE
Corsino Ruben Rodriguez, 2N 439 Elm Ave.,
Elmhurst, Ill. 60126
Filed Sept. 7, 1967, Ser. No. 666,148
Int. Cl. B60r 9/06; B60v 11/00
U.S. Cl. 224—42.03                                    5 Claims

ABSTRACT OF THE DISCLOSURE

Bicycle carriers are adapted to be detachably mounted in pairs on an automobile bumper to cradle the wheels and carry a bicycle. The bicycle support of each carrier is formed of three steel strips shaped generally in the form of the letter Y inverted and hooking over the upper edge of a bumper and curving over the side of the bumper to support adjacent the bumper in vertical positions two diverging wheel-cradling elements having outer ends reversely bent to cradle the tire of a bicycle wheel. The three elements of the Y-shaped wheel support structure generally parallel individually the externally applied load on the respective elements, the Y-shaped structure being held against upward displacement by hold-down elements which engage the lower bumper edge and which are formed preferably of steel strip. A flexible tie-down element on each carrier holds a bicycle against dislodgment from the diverging wheel-cradling elements.

---

The present invention relates to bicycle carriers adapted to be detachably mounted in pairs on the bumper of an automobile.

Even though a bicycle is not heavy, it is, nevertheless, awkward and inconvenient to transport in a passenger automobile. A bicycle is normally too big to fit inside most automobiles and if carried inside takes up an inordinate amount of room.

The desirability of transporting bicycles by automobile is, as a practical matter, frustrated usually in some degree by the impracticality involved, with the consequence that the desire of transporting bicycles by automobile is often foresaken. Frequently, it finds expression in various makeshift arrangements, characteristically inconvenient, to tie bicycles in some way to vehicle bumpers.

Thus, the bumper of an automotive vehicle has been recognized as the most logical available support for carrying a bicycle. Prior to this invention, others have devised bicycle carriers adapted to be detachably mounted on automobile bumpers. The devising of a bicycle carrier suitable for detachable mounting on an automobile bumper has been complicated by the wide diversity in the size and shape of such bumpers.

While prior bicycle carriers designed to be detachably mounted on automobile bumpers may have been workable for their intended purpose, nevertheless such prior bicycle carriers have, for the most part, been impractical and generally without utility as a practical matter for the large mass of bicycle owners who have need for means for transporting bicycles on automobile bumpers.

A principal shortcoming of prior bicycle carriers adapted for detachable mounting on automobile bumpers has been the fact of the inherent cost of such carriers being in excess of that which can be justified from an economic standpoint by most persons who have a potential need for such carriers. The general complexity of prior carriers has been attended not only by characteristically high cost but by characteristic instability in many instances in the support provided to the bicycle in transport.

One object of the invention is to provide for detachable mounting in pairs on an automobile bumper an improved bicycle carrier having a novel and advantageous construction well suited to serve the intended purpose of transporting a bicycle while at the same time being suitable for low cost manufacture, such that the carrier can be manufactured and sold at a cost well within limits justifiable and acceptable to the parents of children whose appraisal of such devices, from the economic standpoint, is colored by bicycles generally being a nonessential luxury for children.

A further object is to provide a bicycle carrier of the character recited having a new and inherently low cost construction which is inherently adapted to be custom fitted to any of many different automobile bumpers of differing size and shape, the carrier when fitted to a particular bumper thereafter riding snugly and steadily on the bumper.

A more particular object of the invention is to provide a bicycle carrier having a new and improved construction by which the carrier is fabricated from a very small number of steel strips shaped and secured together in a highly economical fashion.

A further object is to provide a bicycle carrier as recited which is so constructed that the parts required to support the weight of a transported bicycle are stressed largely in tension and are physically positioned in generally parallel relation to the vector directions of the load applied by the weight of the transported bicycle.

A collateral object is to provide a bicycle carrier of the character recited in which the component parts supporting the bicycle are stressed largely in tension as a consequence of sustaining the applied weight of the bicycle with the consequence that the weight of the bicycle is supported quite steadily by means of carrier structure which can be quite simple and light in weight and hence inherently economical to fabricate.

Other objects and advantages will become apparent from the following description of the preferred embodiment of the invention illustrated in the drawings, in which:

FIG. 1 is an elevational view showing a bicycle being transported on the rear bumper of an automobile by means of a pair of bicycle carriers embodying the invention;

FIG. 2 is a side view on a somewhat enlarged scale taken generally with reference to the line 2—2 in FIG. 1;

FIG. 3 is a perspective view on an enlarged scale illustrating one of the two carriers in the shape the carrier is acquired by the user prior to the first installation of the carrier on a bumper;

FIG. 4 is a side view illustrating in phantom lines the first step in the first application of the carrier to a bumper, shown in cross section, and showing in solid lines a side view of the carrier after it is mounted on the bumper with a supported bicycle wheel, illustrated in section, cradled in place on the carrier; and FIG. 5 is a detailed view on an enlarged scale taken with reference to the line 5—5 in FIG. 4 and illustrating the connection together of the three steel strips which cradle a bicycle wheel and sustain the weight applied by the wheel.

Referring to the drawings in greater detail, the two bicycle carriers 10 forming the preferred embodiment of the invention illustrated are designed to be detachably mounted in pairs on the bumper 12 of an automobile 14. The two carriers cradle and support respectively the two wheels 16 of a bicycle 18 supported, as shown, in an upright position extending transversely with respect to the automobile.

As best illustrated in FIGS. 2, 3 and 4, the structure of each carrier 10 which cradles and supports one of the bicycle wheels 16 on the bumper 12 is fashioned from three simple steel strips 20, 22, 24 suitably secured together at a common juncture 26, preferably by means of a plurality of simple rivets 28 so that the three strips as fixed together have an overall shape, as illustrated in FIG. 3, simulating that of the letter Y inverted.

Thus, the two steel strips 22, 24 are generally straight and depend downwardly from the steel strip 20 in laterally diverging relation to each other in a manner such that a central reference plane 30, FIG. 5, through the upwardly extending strip 20 generally bisects the angle 32 of divergence of the depending strips 22, 24.

The upwardly extending steel strip 20 constitutes a mounting strap (also denoted by the number 20) which functions to sustain in tension the entire applied weight on the carrier. The end of the mounting strap 20 opposite from the juncture 26 is reversely bent inwardly and downwardly, as illustrated in FIGS. 3 and 4, to form as an integral part of the mounting strap 20 a support hook 34 which opens inwardly to fit around the upper marginal edge 36 of the automobile bumper 12 as illustrated.

It is contemplated that, except for the integral support hook 34, the mounting strap 20 will be straight in shape as the carrier is manufactured and sold to the user. The manner in which the mounting strap 20, formed of bendable steel strip as indicated, is custom fitted to the particular bumper on which the carrier is installed will be referred to presently.

The two diverging strips 22, 24 diverging from their common juncture 26 with the mounting strap 20 constitute wheel-cradling elements denoted by the same reference numbers 22, 24. The lower ends of the two diverging wheel-cradling elements 22, 24 are reversely curved outwardly and upwardly, as shown in FIGS. 2 to 4, to form respectively bicycle cradling bends 38, 40 of generally U-shape dimensioned individually to receive a bicycle tire segment 42, FIG. 4, and opening upwardly and inwardly along the respective cradling elements to receive and cradle one wheel 16 of the supported bicycle 18.

Except for the integral tire-cradling bends 38, 40, the wheel-cradling elements 22, 24 are generally straight and converge inwardly and upwardly to the juncture 26 with the mounting strap 20. The length of the upwardly converging cradling elements 22, 24 and the angle 32, FIG. 5, of mutual divergence of the cradling elements are such that both wheel-cradling elements 22, 24 converge generally toward the axle 44 of the supported wheel with the consequence that the cradling elements 22, 24 are individually located in positions approaching a parallel relation to the vector directions of the bicycle wheel forces on the respective cradling elements. The consequence of this is that the upwardly converging wheel-cradling elements 22, 24, like the previously mentioned mounting strap 20, act in tension to sustain the applied load, except for the wheel-cradling bends 38, 40. As a consequence, the long, straight shanks of the wheel-cradling elements 22, 24 and the common juncture 26 of the three load sustaining elements 20, 22, 24 are not normally subjected to large bending forces.

Because of the minimization of structure subjected to bending forces and by virtue of the capability which steel has to sustain very strong forces in tension, the three steel strips 20, 22, 24 which carry the bicycle weight need not be of heavy construction. This is conducive to economical fabrication of the carrier from lightweight and inherently low cost steel strip.

The carrier 10 is restrained against displacement from its normal mounted position on a bumper by convenient hold-down means 46 preferably comprising a hold-down strap 48 formed of steel strip secured at one end to a medial portion of the mounting strap 20 as by a rivet 50 and a coacting clamping strap 52 also formed of a strip of steel. The hold-down strap 48 extends downwardly in symmetrical relation to the plane 30 bisecting the angle 32 of divergence of the wheel-cradling elements 22, 24, FIG. 5.

One end of the clamping strap 52 is turned upwardly and inwardly to form a hold-down hook 54 adapted to fit around the lower marginal edge 56, FIG. 4, of the bumper 12. The end of the clamping strap 52 opposite the integral hook 54 and the adjacent depending end of the hold-down strap 48 are individually turned outwardly at right angles to adjacent portions of the clamping strap and hold-down strap respectively, as shown in FIGS. 2 to 4, to form two apertured ears 58, 60 through which is extended a threaded tension screw 62 receiving a wing nut 64, FIG. 4. As will presently appear, tightening of the wing nut 64 pulls the clamping strap 52 toward the hold-down strap 48 to secure the carrier detachably in its mounted position on the bumper.

A hold-down chain 66 suitably secured as by an eyelet 68 to the mounting strap 20 of the carrier 10 and sheathed along its outer portion within a protective flexible tube 70 and carrying at its outer end a suitable hook 72 is provided to secure against upward dislodgement a bicycle cradled in the carrier as illustrated in FIGS. 1 and 2.

As previously intimated, the carrier 10 is manufactured and supplied to the user preferably with the mounting strap 20 in a straight condition as illustrated in FIG. 3. To custom fit the carrier to the bumper of his particular automobile, the user first hooks the support hook 34 around the upper marginal edge 36 of the bumper 12, as shown in FIG. 4, the initial position of the carrier, when such hooking is first effected, being illustrated in phantom lines in FIG. 4. Then, by applying only a very moderate amount of manual pressure to the outwardly projecting wheel-cradling elements 22, 24, as indicated by the arrows 73 in FIG. 4, the user bends the bendable steel mounting strap 20 downwardly over the portion 74, FIG. 4, of the bumper projecting outwardly and downwardly from the upper edge of the bumper and in this simple act custom fits the carrier to the bumper of his particular automobile. The bendable hold-down strap 48 is swung inwardly into engagement with the lower portion of the bumper, the clamping strap 46 is hooked around the lower edge of the bumper and the threaded screw and wing nut 62, 64 are employed to forcibly pull the clamping strap 46 toward the hold-down strap 48 to secure the hold-down hook 54 in engagement with the lower marginal edge 56 of the bumper.

Once the carrier 10 is custom fitted to the bumper in which it is used in this simple fashion, it can subsequently be remounted by simply moving the preshaped carrier into its mounted position and securing the clamping strap 46 in place.

With the two carriers 10 mounted on the bumper 12, the bicycle 18 is simply lifted into place so that the bicycle wheels 16 are cradled in the respective carriers and the tiedown or safety chains 66 of the respective carriers are hooked around the bicycle as illustrated in FIG. 2 as a precautionary or safety measure to assure that the bicycle does not become dislodged in transport.

The invention is claimed as follows:
1. A bicycle carrier formed of metal strips and adapted to be detachably mounted on an automobile bumper and comprising, in combination, a steel mounting strap formed of a strip of steel and having at one end a reverse bend forming a support hook adapted to fit around the upper edge of an automobile bumper, said mounting strap being bendable in a lateral direction to conform in shape and curvature to a portion of an automobile bumper extending outwardly and downwardly from the upper edge of the bumper which may be engaged by said support hook on the mounting strap, two generally straight bicycle wheel-cradling elements formed of steel strip, said wheel-cradling elements being secured at support ends thereof to said mounting strap near the end thereof opposite from said support hook, said wheel-cradling elements diverging away from each other to depend downwardly from said mounting strap and to diverge laterally in opposite directions when the mounting strap is in its normal operating position, the projecting ends of said wheel-cradling elements being reversely curved to form bicycle tire cradling bends of generally U-shape dimensioned individually to receive a bicycle tire segment and opening inwardly along said respective wheel-cradling elements to receive and cradle a bicycle tire, a carrier hold-down strap formed of a bendable strip of steel secured to a medial portion of said mounting strap and depending therefrom in a direction extending generally away from the hook end of said mounting strap in symmetrical relation to a plane generally bisecting the angle of divergence of said wheel-cradling elements, said hold-down strap being bendable in a lateral direction to conform in shape and curvature to an automobile bumper, a carrier clamping strap formed of a strip of steel having at one end a reverse bend forming a hold-down hook adapted to fit around the lower edge of an automobile vehicle bumper, the end of said clamping strap and the projecting end of said hold-down strap each having end portions turned outwardly generally at a right angle in relation to adjacent portions of said clamping strap and said hold-down strap respectively, threaded fastening means extending through the outwardly turned adjacent ends of said hold-down strap and said clamping strap to pull the latter toward each other to tighten said support hook and said hold-down hook in mounted positions in which said hooks receive respectively the upper and lower edges of an automobile bumper, and a flexible bicycle tie-down element secured to said mounting strap.

2. A bicycle carrier formed of metal strips and adapted to be detachably mounted on an automobile bumper and comprising, in combination, a steel mounting strap formed of a strip of steel and having at one end a reverse bend forming a bumper receiving support hook, said mounting strap being bendable in a lateral direction, two generally straight bicycle wheel-cradling elements formed of steel strip, said wheel-cradling elements being secured at support ends thereof to said mounting strap near the end thereof opposite from said support hook and extending away from said mounting strap in mutually diverging relation to each other to depend downwardly from the mounting strap, the projecting ends of said wheel-cradling elements being reversely curved to form bicycle tire cradling bends, a carrier hold-down strap formed of a bendable strip of steel secured to said mounting strap and depending therefrom, a carrier clamping strap formed of a strip of steel having at one end a reverse bend forming a bumper receiving hold-down hook, hold-down tightening means connecting said hold-down strap and said clamping strap to pull the latter toward each other, and bicycle tie-down means interconnected with said mounting strap.

3. A bicycle carrier formed of metal strips and adapted to be detachably mounted on an automobile bumper and comprising, in combination, a metal mounting strap formed of a metal strip and having on one end thereof a bumper receiving support hook, said mounting strap being bendable in a lateral direction, two generally straight bicycle wheel-cradling elements formed of metal strip, said respective wheel-cradling elements having support ends thereof attached directly to the end of said mounting strap opposite from said support hook and extending away from said mounting strap in mutually diverging relation to each other to depend downwardly from the mounting strap, said wheel-cradling elements having projecting ends curved to form bicycle tire cradling bends, carrier hold-down means interconnected with said mounting strap and having a bumper receiving hold-down hook, and said carrier hold-down means including means for controllably retracting said hold-down hook with respect to said mounting strap.

4. A bicycle carrier adapted to be detachably mounted on an automobile bumper and comprising, in combination, a metal mounting strap having at one end a support hook adapted to fit around the upper edge of an automobile bumper, said mounting strap being bendable in a lateral direction to conform in shape and curvature to a portion of an automobile bumper extending outwardly and downwardly from the upper edge of the bumper which may be engaged by said support hook, two bicycle wheel-cradling elements attached directly to the end of said mounting strap opposite from said support hook and projecting away from the mounting strap and away from each other in laterally opposite directions with respect to the mounting strap, said respective wheel-cradling elements having projecting ends curved to form bicycle tire cradling bends dimensioned individually to receive and cradle a bicycle tire segment, a carrier hold-down strap formed of a bendable strip of metal secured to said mounting strap and depending therefrom, said hold-down strap being bendable in a lateral direction to conform in shape and curvature to an automobile bumper, means forming a hold-down hook adapted to fit around the lower edge of an automobile vehicle bumper, and tightening means connecting said hold-down strap to said hold-down hook forming means to draw said hold-down hook toward said hold-down strap.

5. A bicycle carrier adapted to be detachably mounted on an automobile bumper and comprising, in combination, an elongated metal mounting element having at one end a bumper engaging support hook, said mounting element being bendable in a lateral direction into a bumper fitting shape, two bicycle wheel-cradling elements attached directly to the end of said mounting element opposite from said support hook and projecting away from the mounting element and away from each other in laterally opposite directions with respect to the mounting element, said respective wheel-cradling elements having projecting ends curved to form bicycle tire cradling bends, a bumper engaging hold-down hook, flexible hook retracting means interconnecting said hold-down hook with said mounting element to retract said hold-down hook with respect to said mounting element, and bicycle tie-down means interconnected with said mounting element.

References Cited
UNITED STATES PATENTS

| 2,639,848 | 5/1953 | Burmeister | 224—42.1 |
| 3,225,986 | 12/1965 | Anderson | 224—42.03 |
| 3,275,206 | 9/1966 | Croft | 224—42.03 |

GERALD M. FORLENZA, Primary Examiner

U.S. Cl. X.R.

224—42.06